(12) United States Patent
Geris et al.

(10) Patent No.: US 8,989,665 B2
(45) Date of Patent: Mar. 24, 2015

(54) PORTABLE ELECTRONIC DEVICE FOR REDUCING SPECIFIC ABSORPTION RATE

(75) Inventors: Ryan Alexander Geris, Kitchener (CA); Christopher David Bernard, Kitchener (CA); Rene Pierre Marchand, Waterloo (CA)

(73) Assignee: Blackberry Limited, Waterloo, Ontario (CA)

( * ) Notice: Subject to any disclaimer, the term of this patent is extended or adjusted under 35 U.S.C. 154(b) by 285 days.

(21) Appl. No.: 13/343,741

(22) Filed: Jan. 5, 2012

(65) Prior Publication Data

US 2013/0178174 A1 Jul. 11, 2013

(51) Int. Cl.
*H04B 7/00* (2006.01)
*H04B 15/00* (2006.01)
*H04B 1/38* (2006.01)
*H04M 1/04* (2006.01)

(52) U.S. Cl.
CPC ............. *H04B 1/3838* (2013.01); *H04M 1/04* (2013.01); *H04M 2250/12* (2013.01)
USPC .......................... 455/41.2; 455/63.4; 455/90.3

(58) Field of Classification Search
CPC ............ H04M 1/0206; H04M 1/0208; H04M 1/0216; H04M 1/0245; H04M 1/0249; H04M 1/72522; H04M 2203/2038; H04M 2203/2088; H04M 2207/18; H04M 2250/22; H04M 3/42
USPC ................................ 455/63.4, 90.3
See application file for complete search history.

(56) References Cited

U.S. PATENT DOCUMENTS

| | | | |
|---|---|---|---|
| 6,301,469 B1 * | 10/2001 | Kim | 455/575.7 |
| 7,646,349 B2 | 1/2010 | Wee | |
| 7,664,054 B2 * | 2/2010 | Adya et al. | 370/255 |
| 8,256,012 B2 * | 8/2012 | Little et al. | 726/27 |
| 2003/0064732 A1 | 4/2003 | McDowell | |
| 2003/0210203 A1 | 11/2003 | Phillips et al. | |
| 2004/0037052 A1 | 2/2004 | Wu et al. | |
| 2004/0214621 A1 | 10/2004 | Ponce De Leon | |
| 2006/0044134 A1 * | 3/2006 | Elliott | 340/539.23 |
| 2007/0123263 A1 * | 5/2007 | Smith et al. | 455/445 |
| 2007/0289858 A1 | 12/2007 | Choi | |
| 2008/0220831 A1 | 9/2008 | Alameh et al. | |
| 2008/0231524 A1 | 9/2008 | Zeiger | |
| 2009/0228720 A1 | 9/2009 | Little et al. | |

(Continued)

FOREIGN PATENT DOCUMENTS

| | | |
|---|---|---|
| EP | 2362613 A1 | 8/2011 |
| GB | 2380359 A | 4/2003 |

OTHER PUBLICATIONS

Corresponding European Patent Application No. EP 12150261.1 Search Report dated Jun. 8, 2012.

(Continued)

*Primary Examiner* — Andrew Wendell
*Assistant Examiner* — Maryam Soltanzadeh
(74) *Attorney, Agent, or Firm* — Perry + Currier Inc.

(57) ABSTRACT

A portable electronic device for reducing specific absorption rate (SAR) is provided. The portable electronic device comprises a processor, at least one antenna, and a sensor enabled to detect when the portable electronic device is being held by a complementary holder, the processor enabled to: determine that the sensor has detected the holder; and, responsively, switch the at least one antenna from an omnidirectional mode to a directional mode such that energy is radiated from a given side of the portable electronic device.

16 Claims, 9 Drawing Sheets

(56) References Cited

U.S. PATENT DOCUMENTS

| | | | |
|---|---|---|---|
| 2010/0265034 A1* | 10/2010 | Cap et al. | 340/5.71 |
| 2011/0014949 A1* | 1/2011 | Arimura | 455/558 |
| 2011/0059706 A1 | 3/2011 | Harel et al. | |
| 2011/0102293 A1* | 5/2011 | Chen et al. | 343/876 |
| 2011/0250928 A1 | 10/2011 | Schlub et al. | |
| 2012/0064841 A1* | 3/2012 | Husted et al. | 455/78 |
| 2012/0258741 A1* | 10/2012 | Tillson et al. | 455/457 |

OTHER PUBLICATIONS

Corresponding Canadian Patent Application No. 2798669, Examination Report dated Jul. 29, 2014.

* cited by examiner

PORTABLE ELECTRONIC DEVICE FOR REDUCING SPECIFIC ABSORPTION RATE

FIELD

The specification relates generally to portable electronic devices, and specifically to a portable electronic device for reducing specific absorption rate and method therefor.

BACKGROUND

When a portable electronic device is placed in a holder, for example a holster sitting on a person's hip, the radio in the portable electronic device is still transmitting, and receiving, power from all directions.

BRIEF DESCRIPTION OF THE DRAWINGS

Implementations are described with reference to the following figures, in which.

DETAILED DESCRIPTION

An aspect of the specification provides a portable electronic device comprising: a processor, at least one antenna, and a sensor enabled to detect when the portable electronic device is being held by a complementary holder, the processor enabled to: determine that the sensor has detected the holder; and, responsively, switch the at least one antenna from an omnidirectional mode to a directional mode such that energy is radiated from a given side of the portable electronic device.

The portable electronic can further comprise a motion sensor, wherein the processor is further enabled to: responsively switch the at least one antenna from the omnidirectional mode to the directional mode when the sensor has detected the holder and the motion detector has detected motion. The motion sensor can comprise one or more of an accelerometer, a geomagnetic sensor, a magnetometer, a Global Positioning System (GPS)-based motion sensor, and a vibration sensor. The processor can be further enabled to determine a direction of movement of the portable electronic device via the motion sensor and responsively select the given side as a side of the portable electronic device facing the direction of movement.

The processor can be further enabled to select the given side as a side facing outwards from the holder.

The sensor can comprise one or more of a magnetic sensor, a Hall effect sensor, a magnetometer, a proximity sensor, an RFID (radio frequency identification) sensor, and a near field communication sensor.

The sensor can be enabled to detect the holder by interacting with a complimentary device at the holder.

The at least one antenna can comprise an omnidirectional antenna and a directional antenna such that: in the omnidirectional mode, the omnidirectional antenna radiates the energy and the directional antenna is off; and in the directional mode, the directional antenna radiates the energy from the given side and the omnidirectional antenna is off.

The at least one antenna can comprise a segmented antenna such that: in the omnidirectional mode, all segments of the segmented antenna radiate the energy; and, in the directional mode, a given subset of the segments of the segmented antenna radiates the energy from the given side and a remaining subset of the segments is off.

The at least one antenna can comprise an omnidirectional antenna that can be switched between the omnidirectional mode and the directional mode. The omnidirectional antenna can be switched between the omnidirectional mode and the directional mode by transmitting antenna signals in a same phase in the directional mode and transmitting the antenna signals in different phases in the omnidirectional mode. The at least one antenna can comprise an antenna array.

The processor can be further enabled to periodically and temporarily switch to the omnidirectional mode to compare a signal strength of the directional mode with a signal strength of the omnidirectional mode, and when the highest signal strength is not received in the directional mode, thereafter cause the at least one antennas to operate in the omnidirectional mode.

The holder can comprise a holster. The holder can comprise a device enabled to be worn by a user and can be further enabled to hold the portable electronic device. The holder can comprise one or more of a hook, a clip, and an accessory enabled to be worn by a user.

The portable electronic can further comprise at least one of a mobile electronic device, a portable communication device, a cell phone, a personal digital assistant, and a smart phone.

Figure 1:
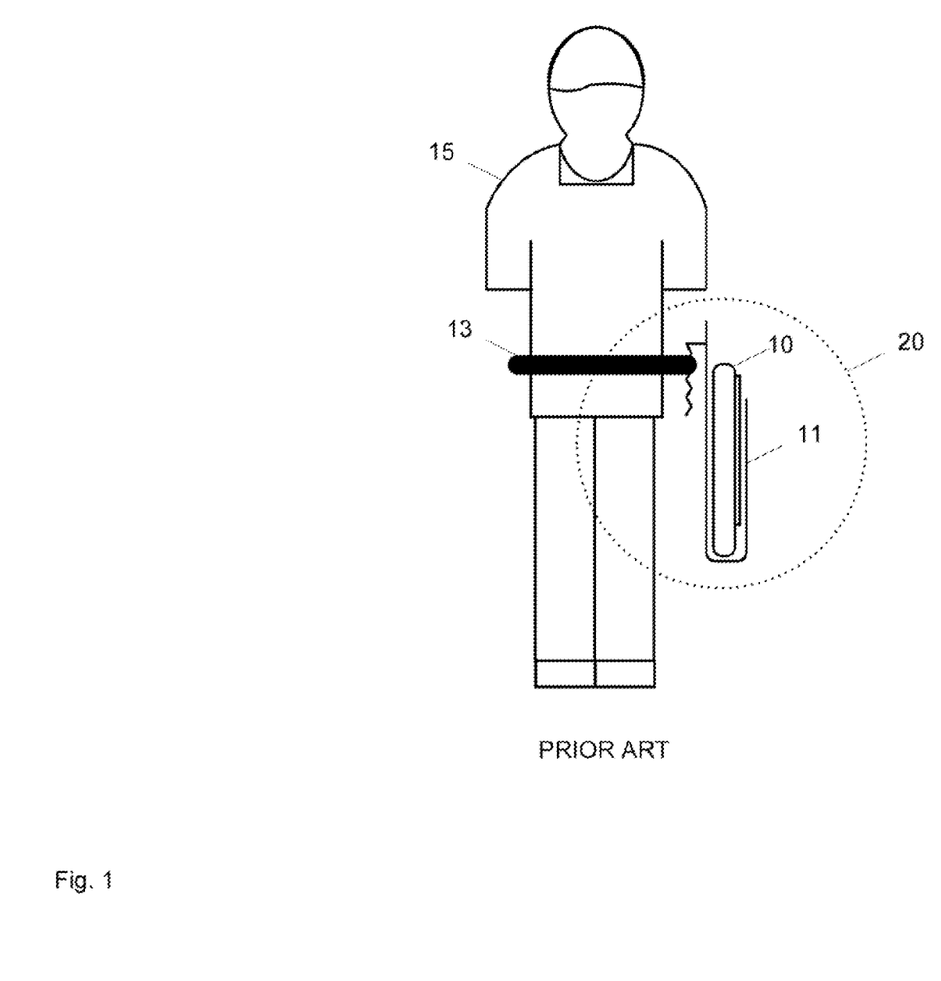
FIG. 1 depicts a portable electronic device that is being held by a complementary holder clipped to a belt of a user, according to the prior art.

Prior to discussing present implementations, attention is directed to FIG. 1, which depicts a portable electronic device 10 that is being held by a complementary holder 11 clipped to a belt 13 of a user 15, according to the prior art. It is appreciated that FIG. 1 is drawn in schematic with proportions that are not to scale: for example holder 11 and portable electronic device 10 are depicted as being larger in scale to user 15 than would generally actually occur. In any event, it is appreciated that, in the prior art, portable electronic device 10 comprises an antenna (not depicted) with a generally omnidirectional radiation pattern 20. Radiation pattern 20 is depicted with broken lines for clarity only. It is appreciated that radiation pattern 20 can be emitting transmission signals and detecting access points such as cell towers and the like by receiving signals therefrom.

In other words, it is appreciated that portable electronic device 10 radiates energy in all directions, such that when portable electronic device 10 is placed in holder 11, energy radiated towards user 15 is largely absorbed by user 15. This leads to high specific absorption rates (SAR) for user 15. In general it is appreciated that the lower the SAR from a portable electronic device, the lower the exposure to electromagnetic radiation which has been linked to potential health risks.

Furthermore, energy absorbed by user 15 is appreciated to be wasted, which leads to reduced battery life of portable electronic device 10.

Figure 2:
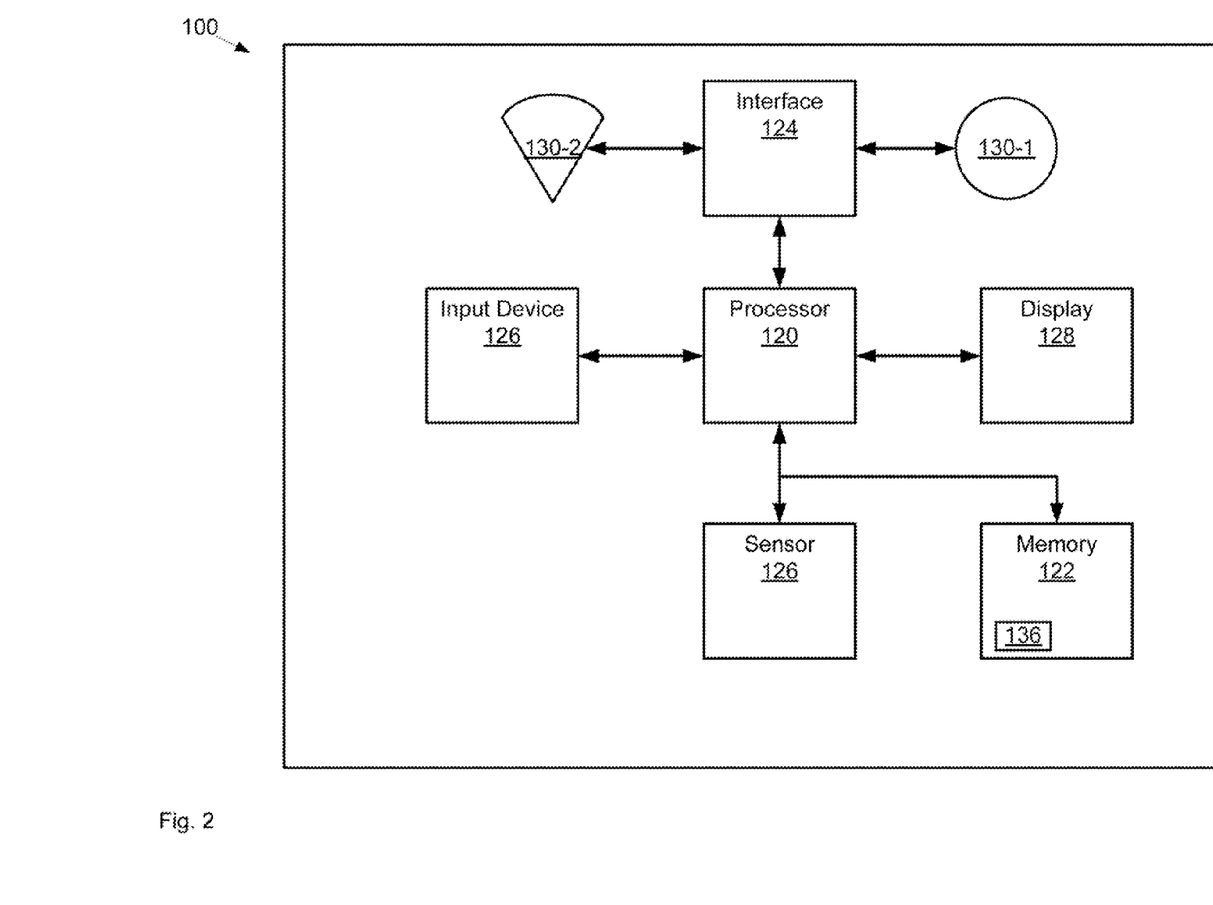
FIG. 2 depicts a portable electronic device for reducing specific absorption rate, according to non-limiting implementations.

Attention is next directed to FIG. 2, which depicts a schematic of a portable electronic device 100 according to present implementations. Portable electronic device 100 will also be referred to hereafter as device 100. Device 100 comprises a processor 120, a memory 122, a communication interface 124, an input device 126, and a display 128. It is further appreciated that, while not depicted, device 100 comprises a power source including but not limited to a battery, solar panels and the like.

Device 100 further comprises at least one antenna 130-1, 130-2 for radiating and receiving energy in communications with access points, such as cell towers, WiFi access points and the like. At least one antenna 130-1, 130-2 will also be referred to generically hereafter as antenna 130, and collectively as antennas 130. In depicted implementations, antenna 130-1 comprises an omnidirectional antenna and antenna 130-2 comprises a directional antenna. Furthermore, processor 120 is enabled to switch between antennas 130 (i.e. independently turn each of antennas 130 on and off) by processing an application 136 stored at memory 122, as described below.

Device 100 further comprises a sensor 140 enabled to detect when device 100 is being held by a complementary holder, such as holder 11, as will be described below.

Devices 100 can comprise any suitable portable electronic device, mobile electronic device, portable communication device, cell phone, personal digital assistant, smart phone, and the like. In general, it is appreciated that device 100 is enabled to be worn by a user when device 100 is being held by a complementary holder, such as holder 11, that is in turn wearable by a user. For example, holder 11 can comprise a holster enabled to be worn on a belt of a user, and device 100 can be placed therein. Many well known portable electronic devices, or variants thereof, are suitable for present implementations.

It is appreciated that holder 11 can comprise any suitable holder for holding device 100, including but not limited to a holster, a hook, a clip, an accessory that can be worn on the person of a user, an accessory that can be placed close to the body of a user, and the like. In any event, it is appreciated that holder 11 is enabled to be worn by a user, and is further enabled to hold device 100.

Processor 120 comprises any suitable processor, or combination of processors, including but not limited to a microprocessor, a central processing unit (CPU) and the like. Other suitable processing units are within the scope of present implementations.

Processor 120 is enabled to receive input from input device 126 and communicate with memory 122, which can comprise one or more of a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 100 as described herein are typically maintained, persistently, in the non-volatile storage unit and used by processor 120 which makes appropriate utilization of the volatile storage unit during the execution of such programming instructions. Those skilled in the art will recognize that memory 122 is an example of non-transitory computer readable media that can store programming instructions executable on processor 120. It is further appreciated that memory 122 is also an example of memory units and/or memory modules.

Memory 122 can comprise any suitable memory device, including but not limited to any suitable one of, or combination of, volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations. In particular, memory 122 is enabled to store application 136, for switching between antennas 130, for processing by processor 120. Those skilled in the art will now recognize that memory 122 is an example of a computer readable media that can store programming instructions executable on the processors of each server.

Communication interface 124 comprises any suitable communication interface, or combination of communication interfaces. In particular interface 124 is enabled to wirelessly communicate with access points to a communication network (not depicted) via antennas 130. Accordingly, interface 124 is enabled to communicate according to any suitable wireless protocol including but not limited to cell-phone protocols, wireless data protocols, Internet protocols, packet-based protocols, analog protocols, PSTN (public switched telephone network) protocols, WiFi protocols, WiMax protocols and/or a combination, or the like. In general, it will be understood that interface 124 is configured to correspond with a network architecture that is used to communicate with access points to a communication network. (In other implementations a plurality different access points with different protocols can be employed to communicate with a communication network and thus a plurality of interfaces can be provided to support each protocol).

Input device 126 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Display 128 comprises any suitable one of or combination of CRT (cathode ray tube) and/or flat panel displays (e.g. LCD (liquid crystal display), plasma, OLED (organic light emitting diode), capacitive or resistive touchscreens, and the like).

Antenna 130-1 comprises any suitable omnidirectional antenna which radiates power/energy generally uniformly in all directions. Antenna 130-1 can include, but is not limited to, whip antennas, "Rubber Ducky" antennas, ground plane antennas, vertically oriented dipole antennas, discone antennas, mast radiators, horizontal loop antennas, and halo antennas, though any suitable omnidirectional antenna which can be integrated into device 100 is within the scope of present implementations.

Antenna 130-2 comprises any suitable directional antenna which radiates greater power in one or more directions. Antennas 130-2 can include, but is not limited to, sector antennas, yagi antennas, log-periodic antennas, corner reflector antennas, and parabolic antennas, though any suitable directional antenna which can be integrated into device 100 is within the scope of present implementations.

It is further appreciated that when antenna 130-2 is on, device 100 radiates energy from a given side, for example a front side of device 100 or a back side of device 100. It is further appreciated that a direction of radiation of antenna 130-2 can be complimentary to a device/holder configuration: in other words, when device 100 is enabled to be held by a holder such that a given side of device 100 is facing outwards when device 100 is being held by the holder, then antenna 130-2 can be enabled to radiate energy from that given side. It is appreciated that antenna 130-2 radiates energy from a side of device 100 that is facing away from a user when device 100 is being held by a holder being worn by a user, as will be explained in further detail below.

Sensor 126 comprises any suitable sensor for detecting a holder. It is appreciated that sensing of the holder occurs only when sensor 126 is proximal to the holder. In other words, sensing of the holder does not occur over a substantial distance, otherwise device 100 would enter a holder mode erratically. Rather, it is appreciated that device 100 is to enter a holder mode only when device 100 is proximal to and/or being held by a holder. For example, sensor 126 can include, but is not limited to, any suitable combination of a magnetic sensor, a Hall Effect sensor, a magnetometer, a proximity sensor, a light detector, an RFID (radio frequency identification) sensor, and a near field communication (NFC) sensor. In some of these implementations, sensor 126 is enabled to detect a holder by interacting with a complimentary device at the holder. For example, when sensor 126 comprises a magnetic sensor, a Hall effect sensor, and/or a magnetometer, the holder comprises a magnet and/or a magnetic device which can be detected by the magnetic sensor, the Hall effect sensor, and/or the magnetometer. Similarly, when sensor 126 comprises an RFID sensor, the holder comprises an RFID device detectable by the RFID sensor; and when sensor comprises an NFC sensor, holder comprises an NFC device detectable by the NFC sensor. When sensor 126 comprises a light detector, the holder can comprise a suitable light (e.g. a light emitting diode (LED)), which can be enabled to turn on for detection by sensor 126 (persistently, periodically, and/or for a given period of time), when device 100 is being held by the holder; these implementations presume that the holder is powered, for example, by a battery. However, it is appreciated that holders with and without batteries and/or battery powered devices are within the scope of present implementations.

Figure 3:
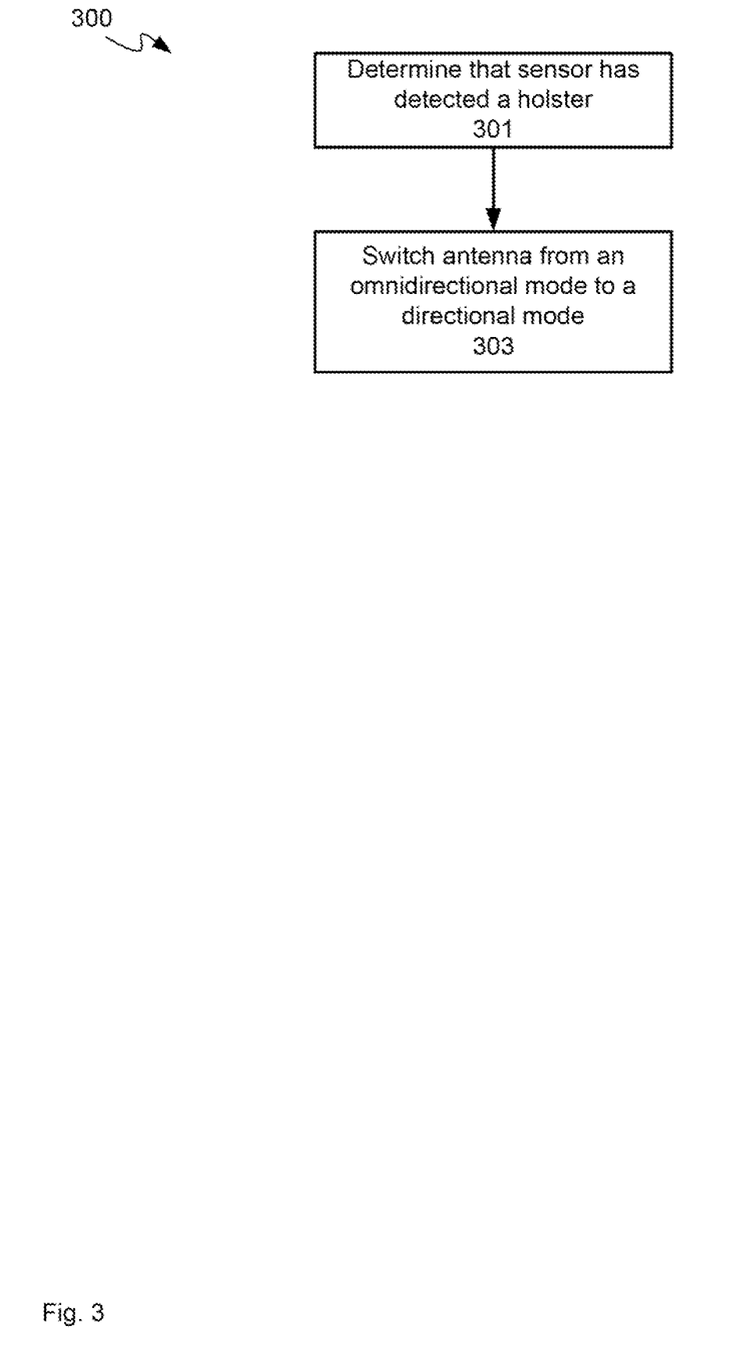
FIG. 3 depicts a method for reducing specific absorption rate, according to non-limiting implementations.

Attention is now directed to FIG. 3 which depicts a method 300 for reducing SAR, according to non-limiting implementations. In order to assist in the explanation of method 300, it will be assumed that method 300 is performed using device 100 For example; method 300 can be implemented at processor 120 when processing application 136. Furthermore, the following discussion of method 300 will lead to a further understanding of device 100 and its various components. However, it is to be understood that device 100 and/or method 300 can be varied, and need not work exactly as discussed herein in conjunction with each other, and that such variations are within the scope of present implementations.

In the discussion of method 300, it is presumed that device 100 is initially not being held by a holder, and that antennas 130 are operating in an omnidirectional mode: in other words, omnidirectional antenna 130-1 is initially on and radiating energy substantially in all directions, while directional antennas 130-2 is off.

At block 301, processor 120 determines that sensor 126 has detected a holder. In other words, device 100 is being held by a holder and sensor 126 detects the holder as described above.

At block 303, responsive to processor 120 determining that sensor 126 has detected a holder, processor 120 switches at least one antenna 130 from an omnidirectional mode to a directional mode such that energy is radiated from a given side of device 100. Hence, antennas 130 are switched to a directional mode wherein directional antenna 130-2 radiates the energy from a given side and omnidirectional antenna 130-1 is off.

It is furthermore appreciated that, in some implementations, device 100 operates at a lower power in the directional mode than in the omnidirectional mode. Alternatively, device 100 can operate at a same or higher power in directional mode, with all energy radiated from the given side of device 100 rather than omnidirectionally, thereby increasing the range of device 100 in the direction of the given side. Indeed, even when operating at the same energy in the directional mode as in the omnidirectional mode, the range of device 100 increases as all the energy is then focussed in a direction of the given side.

Figure 4A:
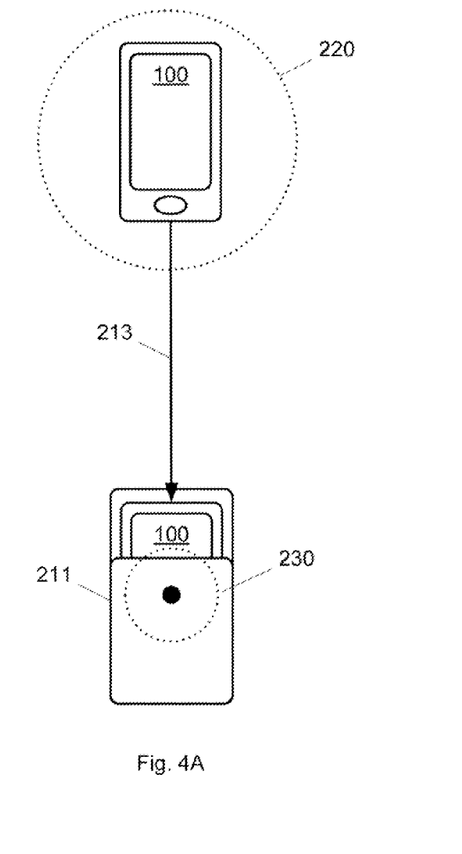
FIGS. 4A and 4B depict front and side views, respectively, a portable electronic device that is being placed in a complementary holder, according to non-limiting implementations.
Figure 4B:
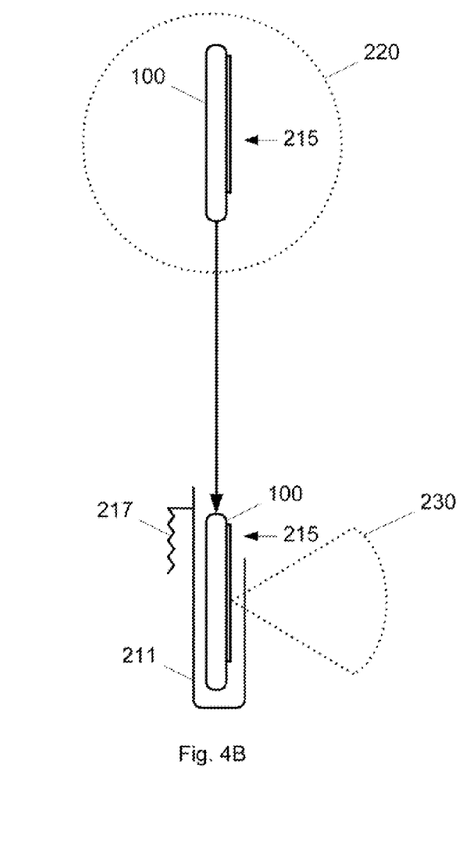

To illustrate method 300, attention is directed to FIGS. 4A and 4B which depict front and side views, respectively, of device 100 and a holder 211, with arrow 213 representing device 100 being placed into holder 211. In FIG. 4B it is appreciated that a front side 215 of device 100 is facing to the right, and that holder 211 comprises a clip 217 for attaching holder 211 to clothing of user 15, such as belt 13. It is further appreciated that in the top portion of each of FIGS. 4A and 4B, device 100 is outside of holder 211, and in the bottom portion of each of FIGS. 4A and 4B, device 100 has been placed in holder 211. It is further appreciated that when device 100 is out of holder 211, device 100 is in an omnidirectional mode; hence, when out of holder 211, device 100 has a generally omnidirectional radiation pattern 220 as omnidirectional antenna 130-1 is on and generally radiating energy in all directions, while directional antenna 130-2 is off.

In contrast to this, when device 100 has been placed in holder 211, method 300 executes: when sensor 126 detects holder 211, device 100 switches to a directional mode, wherein device 100 has a generally directional radiation pattern 230 as directional antenna 130-2 is turned on and generally radiating energy towards a given side of device 100, while omnidirectional antenna 130-2 is turned off.

Figure 5:
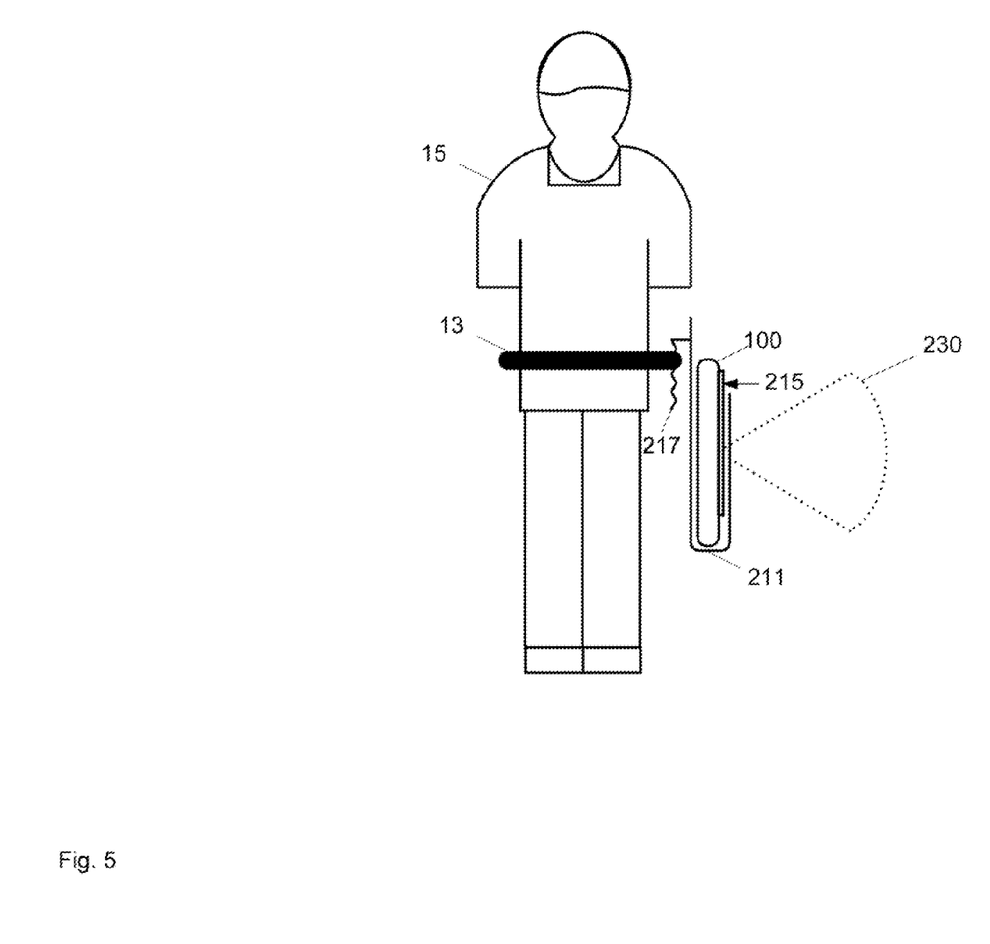
FIG. 5 depicts a portable electronic device that is being held by a complementary holder clipped to a belt of a user, according to non-limiting implementations.

To further illustrate this, attention is now directed to FIG. 5 which is similar to FIG. 1, with like elements having like numbers, however in these implementations, user 15 is wearing holder 211 and has placed device 100 therein, such that holder 211 has been detected by sensor 126. In response, device 100 has switched to a directional mode and hence has radiation pattern 230. As radiation is directed away from user 15, as compared to FIG. 1, SAR is reduced.

With reference to both FIGS. 4B and 5, it is appreciated that, in these implementations, directional antenna radiation pattern 230 is directed towards front side 215 of device 100 and that device 100 and holder 211 are configured so that device 100 is to be placed in holder 211 with front side 215 facing towards a front side of holder 211, opposite clip 217. In other words, it is appreciated that holder 211 is enabled to be clipped to belt 13, and that device 100 is to be placed into holder 211 with front side 215 facing away from clip 217, and hence facing away from user 15 such that radiation pattern 230 is also directed away from user 15. In other implementations, device 100 can be configured such that front side 215 faces towards user 15 when in holder 211, and directional antenna 130-2 can be accordingly enabled to radiate energy towards a back side of device 100, which will be facing towards a front of holder 211 and hence away from user 15, such that SAR is reduced.

In some of these implementations, device 100 can be placed in a holder and placed on surface, counter, desktop or the like, in any orientation (facing up, facing down, facing sideways, etc.) but not worn, causing antennas 130 at device 100 to enter the directional mode when the directional mode may not be desired. Hence, in some of these implementations, processor 120 can be further enabled to periodically temporarily switch to the omnidirectional mode to compare a signal strength of the directional mode with a signal strength of the omnidirectional mode, and when the highest signal strength is not received in the directional mode, thereafter cause the at least one antennas to operate in the omnidirectional mode. For example, when in the directional mode, processor 120 is enabled to periodically turn on omnidirectional antenna 130-1 to receive signals, and compare a signal strength received at omnidirectional antenna 130-1 with a signal strength received from directional antenna 130-2. When there is no substantial difference or when the signal strength from omnidirectional antenna 130-1 is lower, device 100 returns to the directional mode; when the signal strength from omnidirectional antenna 130-1 is higher, device 100 switches back to the omnidirectional mode. It is appreciated that, when the signal strength from omnidirectional antenna 130-1 is higher, energy emitted from directional antenna 130-2 is either being absorbed, for example when device 100 is face down on a counter, or no substantial absorbers are behind device 100, for example when device 100 is not being worn.

Figure 6:
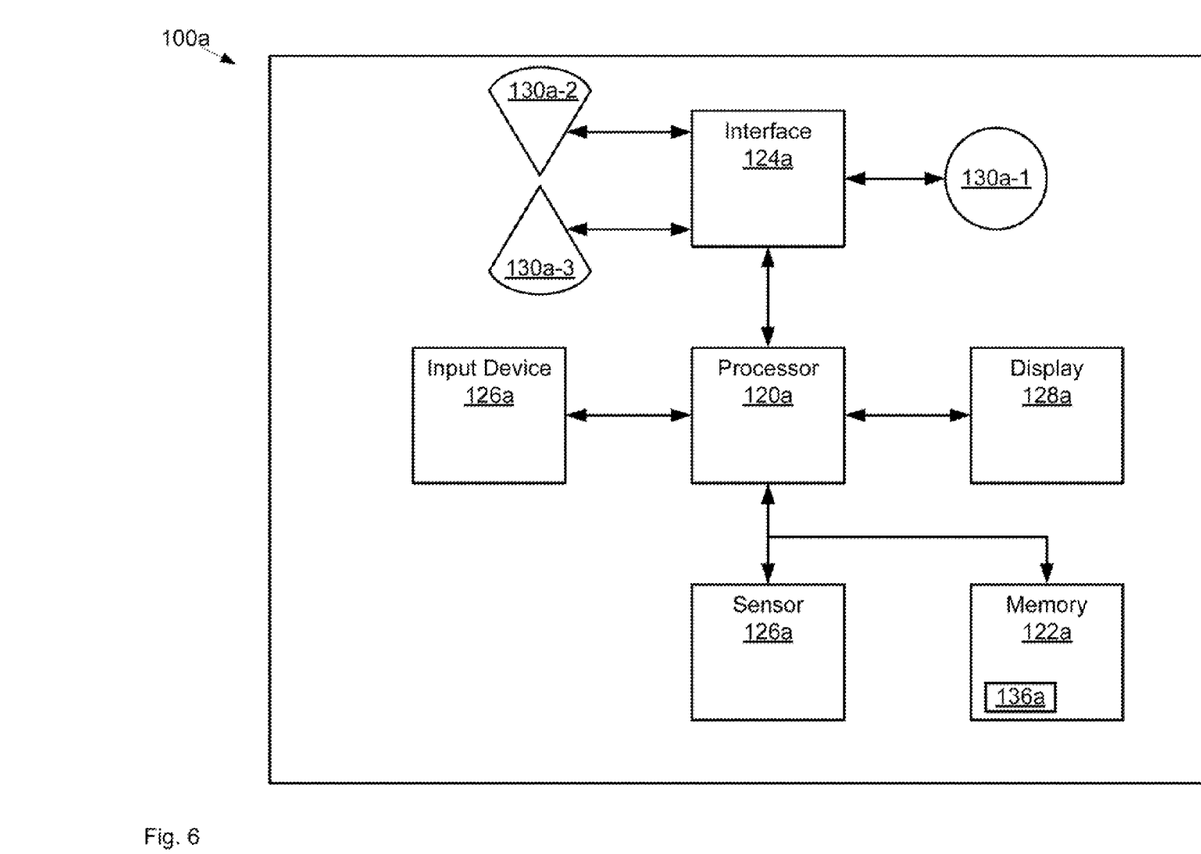
FIGS. 6 and 7 depict a portable electronic device for reducing specific absorption rate, according to non-limiting implementations.

Attention is next directed to FIG. 6, which depicts a schematic diagram of a device 100a, which is substantially similar to FIG. 2, with like elements having like numbers, however with an "a" appended thereto. However, device 100a comprises three antennas 130a: an omnidirectional antenna 130a-1, and two directional antennas 130a-2, 130a-3. Omnidirectional antenna 130a-1 is similar to omnidirectional antenna 130-1, and directional antenna 130a-2 is similar to directional antenna 130-2, such that directional antennas 130a-2 is enabled to radiate energy towards a front side of device 100a. Directional antenna 130a-3, however, is enabled to radiate energy towards a back side of device 100a, and is otherwise similar to directional antenna 130-2. Sensor 126a is similar to sensor 126, however sensor 126a is further enabled to sense an orientation of device 100a when device 100a is being held by a holder, such as holder 211: for example, sensor 126a is enabled to sense whether device 100a is oriented facing towards a front side of a holder (away from a user) or oriented facing towards a back side of a holder (towards a user). Hence, processor 120a is further enabled to determine an orientation of device 100a in a holder via sensor 126a, and responsively switch antenna 130a from an omnidirectional mode to a directional mode such that energy is radiated from a given side of device 100a that is facing outwards from the holder and hence away from a user. In other words, when processor 120a determines an orientation of device 100a when being held by a holder, processor 120a causes omnidirectional antenna 130a-1 to be turned off, and a given one of directional antennas 130a-2, 130a-3 to be turned on, such that energy is radiated away from a user. For example, when device 100a is facing forwards in the holder, directional antenna 130a-2 is turned on, and directional antenna 130a-3 remains off; and when device 100a is facing backwards in the holder, directional antenna 130a-3 is turned on, and directional antenna 130a-2 remains off.

In some implementations, sensor 126a determines an orientation of device 100a in a holder by interacting with a complimentary device at the holder. For example, sensor 126a can comprise an RFID detector and the holder can comprise respective RFID tags on the front and back sides of the holder, each respective RFID tag storing data indicative of its respective side, which is read by the RFID detector. The data which is read is received and processed by processor 120a to determine the orientation. However, any suitable combination of software and hardware for determining an orientation of device 100a in a holder is within the scope of present implementations, including but not limited to light detectors, magnetic detectors, NFC detectors and the like, each of which can detect complimentary devices on the front and rear of a holder.

Figure 7:
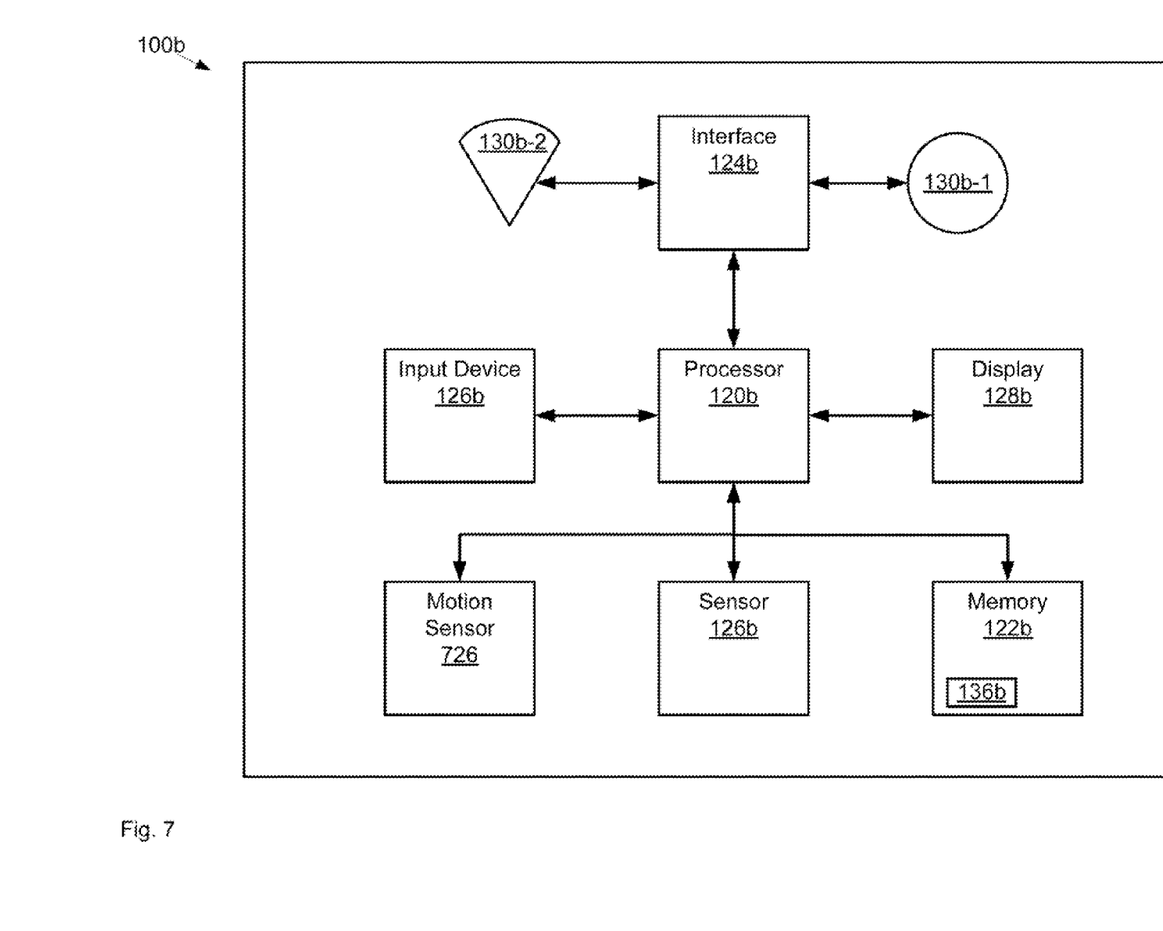
Figure 8:
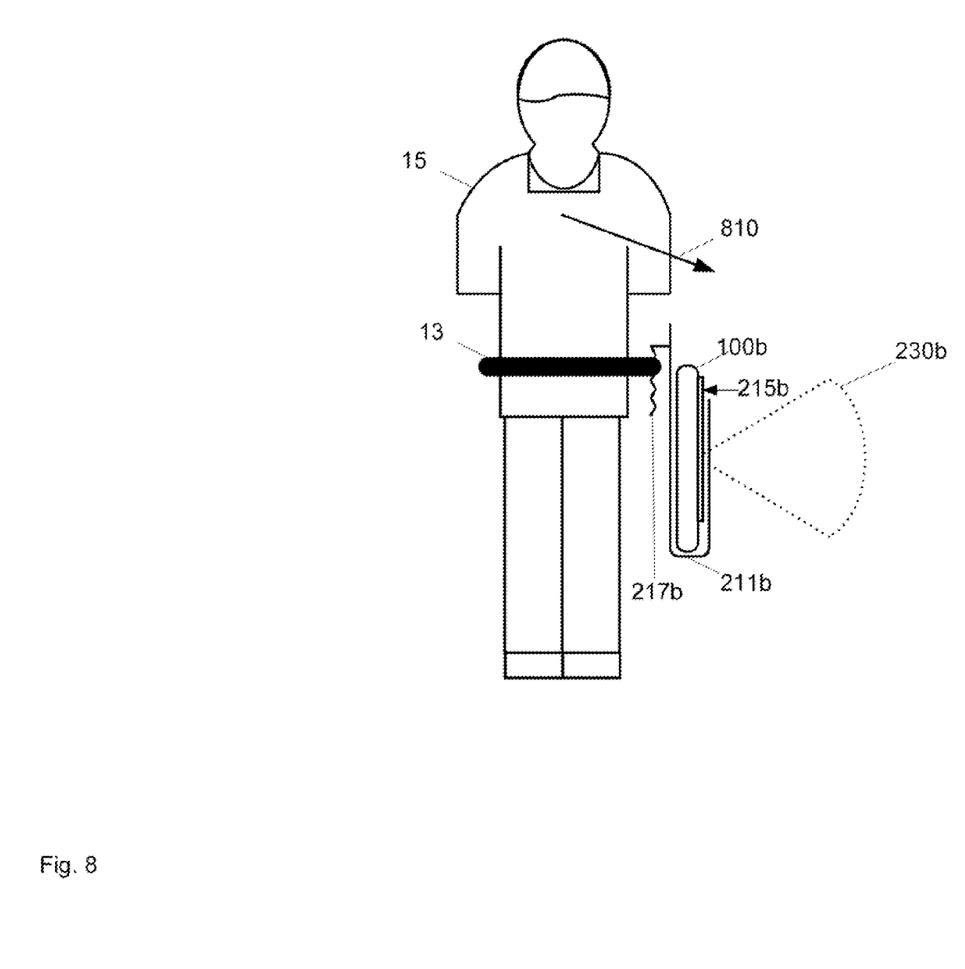
FIG. 8 depicts a portable electronic device that is being held by a complementary holder clipped to a belt of a user, according to non-limiting implementations.

Attention is next directed to FIG. 7, which depicts a schematic diagram of a device 100b, and which is substantially similar to FIG. 2, with like elements having like numbers, however with a "b" appended thereto. However, device 100b further comprises a motion sensor 726 for detecting motion of device 100b. Motion sensor 726 can include, but is not limited to, one or more of an accelerometer, a geomagnetic sensor, a magnetometer, a Global Positioning System (GPS)-based motion sensor, and a vibration sensor. In these implementations, processor 120b is enabled to responsively switch at least one antenna 130b from an omnidirectional mode to a directional mode when sensor 126b has detected a holder and motion detector 726 has detected motion. Hence, as depicted in FIG. 8, for example, when device 100b is in a holder 211b, and holder 211b is attached to a moving object (e.g. when as clipped to a belt 13 of user 15, via clip 217b) device 100b is switched to a directional mode. A direction of movement of user 15 in FIG. 8 is indicated by arrow 810, and intended to indicate that user 15 is moving forward. Hence, omnidirectional antenna 130b-1 is turned off and directional antenna 130b-2 is turned on so that device 100b has a radiation pattern 230b directed towards a given face 215b of device 100b, and hence away from a user 15 thereby reducing SAR. It is appreciated that, in these implementations, when device 100b is being held by holder 211b but not moving, omnidirectional antenna 130b-1 is turned on and directional antenna 130b-2 is turned off, so that device 100b has a radiation pattern similar to radiation patterns 20, 220. This prevents device 100b and antennas 130b from entering a directional mode when device 100b is placed in holder 211b and then placed on a surface, counter, desktop, or the like, but not worn.

In some implementations, device 100b comprises two directional antennas similar to directional antennas 130a-2, 130a-3, and motion sensor 726 is further enabled to sense a direction of motion of device 100b; in these implementations, processor 120b is further enabled to determine a direction of movement of device 100b via motion sensor 726 and responsively select a given side of device 100 as a side facing the direction of movement. In other words, processor 120 responsively selects a respective directional antenna to turn on such that the directional radiation pattern of device 100b is towards the direction of movement, and hence away from a user, thereby reducing SAR.

Figure 9:
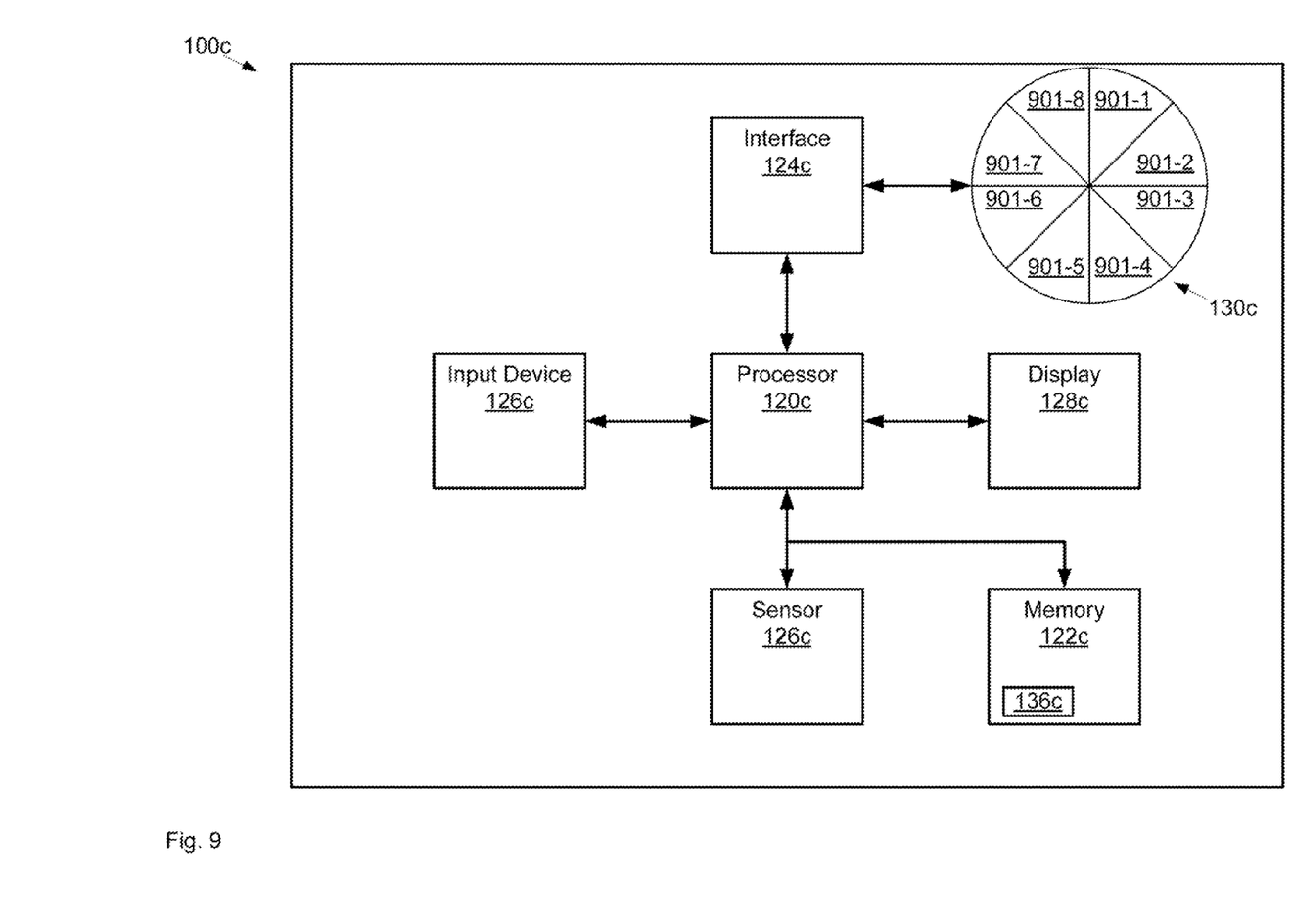
FIG. 9 depicts a portable electronic device for reducing specific absorption rate, according to non-limiting implementations.

Attention is now directed to FIG. 9, which depicts a schematic diagram of a device 100c, and which is substantially similar to FIG. 2, with like elements having like numbers, however with a "c" appended thereto. However, device 100c comprises a segmented antenna 130c, comprising a plurality of segments 901-1 to 901-8, each segment 901 enabled to radiate energy in a respective direction. It is appreciated that segments 901 can be controlled by processor 120c to turn on or turn off. It is further appreciated that while eight segments arranged in a circle are depicted in FIG. 9, segmented antenna 130c can comprise any suitable number of segments 901, in any suitable arrangement.

It is further appreciated that while segments 901 are depicted as touching in FIG. 8, in other implementations, segments 901 may not be touching. For example, in some implementations, segmented antenna 130c can comprise a first segment facing substantially forward (i.e. towards a front side of device 100c) and a second segment facing substantially backward (i.e. towards a back side of device 100c), with respective radiation patterns overlapping at the sides, but with no segments directed towards the sides, much like the combination of directional antennas 130a-2, 130a-3 of FIG. 6. In any event, it is appreciated that when all segments 901 are on, segmented antenna 130c is enabled as an omnidirectional antenna; and when only a subset of segments 901 are on, for example, one to seven contiguous segments 901 (i.e. at least one segment 901 is off), segmented antenna 130c is enabled as a directional antenna.

It is further appreciated any other process for changing a directional antenna into an omnidirectional antenna is within the scope of present implementations, including but not limited to transmitting directional antenna signals in the same phase. It is furthermore appreciate that some implementations an array of antennas that can be switched between a direction mode and an omnidirectional mode by not changing the phase of signals received by the array such that the array enters an omnidirectional mode; when the phase is changed to the same phase, the array can be switched to a directional mode.

Method 300 can hence be implemented in device 100c, however in the omnidirectional mode, all segments 901 of segmented antenna 130c radiate energy; and, in the directional mode, a given subset of the segments 901 of segmented antenna 130c radiates the energy from a given side of device 100c and a remaining subset of segments 901 are off. For example, in the directional mode, only segments 901-1 and 901-8, which together can face substantially towards a front face of device 100c, radiate energy and thereby comprise a radiation pattern similar to radiation pattern 230.

It is appreciated that in other implementations, processor 120c can be enabled to determine one or more of an orientation of device 100c in a holder and a direction of motion of device 100c, and control segmented antenna 130c accordingly. For example, when device 100c is facing a rear of a holder, processor 120c can control segments 901-4 and 901-5 to turn on, facing a rear of device 100c such that a corresponding radiation pattern is facing away from a user, similar to device 100a. When processor 120c determines that device 100c is in a holder (e.g via sensor 126c), and further determines that device 100c is moving (e.g. via a motion sensor, not depicted, similar to motion sensor 726), processor 120c can control respective segments 901 to radiate energy in a direction of motion, similar to device 100b.

It is yet further appreciated that each of devices 100-100c described herein can comprise any suitable combination of sensors for detecting a holder (similar to sensors 126-126c), motion sensors, omnidirectional antennas, directional antennas and segmented antennas, with respective processors 120-120c enabled to process data from respective sensors and/or respective motion sensors to control omnidirectional antennas, directional antennas and segmented antennas to radiate energy away from a user to reduce SAR. Furthermore, by radiating energy towards a direction where it will not be absorbed, device 100-100c can operate more efficiently.

Those skilled in the art will appreciate that in some implementations, the functionality of devices 100, 100a, 100b, 100c can be implemented using pre-programmed hardware or firmware elements (e.g., application specific integrated circuits (ASICs), electrically erasable programmable read-only memories (EEPROMs), etc.), or other related components. In other implementations, the functionality of devices 100, 100a, 100b, 100c can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the implementations, and that the above implementations and examples are only illustrations of one or more implementations. The scope, therefore, is only to be limited by the claims appended hereto.

What is claimed is:

1. A portable electronic device comprising:
a processor, at least one antenna, and a sensor enabled to detect when the portable electronic device is being held by a complementary holder, the processor enabled to:
determine that the sensor has detected the holder;
responsively switch the at least one antenna from an omnidirectional mode to a directional mode such that energy is radiated from a given side of the portable electronic device; and,
when the at least one antenna has been switched to the directional mode after detection of the holder, periodically and temporarily switch to the omnidirectional mode to compare a signal strength of the directional mode with a signal strength of the omnidirectional mode; when the highest signal strength is not received in the directional mode, thereafter cause the at least one antennas to operate in the omnidirectional mode; and when there is no substantial difference between the signal strength of the directional mode and the signal strength of the omnidirectional mode, or when the signal strength of omnidirectional antenna is lower than the signal strength of the directional mode, return the at least one antennas to the directional mode.

2. The portable electronic device of claim 1, further comprising a motion sensor, wherein the processor is further enabled to:
responsively switch the at least one antenna from the omnidirectional mode to the directional mode when the sensor has detected the holder and the motion detector has detected motion.

3. The portable electronic device of claim 2, wherein the motion sensor comprises one or more of an accelerometer, a geomagnetic sensor, a magnetometer, a Global Positioning System (GPS)-based motion sensor, and a vibration sensor.

4. The portable electronic device of claim 2, wherein the processor is further enabled to determine a direction of movement of the portable electronic device via the motion sensor and responsively select the given side as a side of the portable electronic device facing the direction of movement.

5. The portable electronic device of claim 1, where the processor is further enabled to select the given side as a side facing outwards from the holder.

6. The portable electronic device of claim 1, wherein the sensor comprises one or more of a magnetic sensor, a Hall effect sensor, a magnetometer, a proximity sensor, and an RFID (radio frequency identification) sensor, and a near field communication sensor.

7. The portable electronic device of claim 1, wherein the sensor is enabled to detect the holder by interacting with a complimentary device at the holder.

8. The portable electronic device of claim 1, wherein the at least one antenna comprises an omnidirectional antenna and a directional antenna such that:
in the omnidirectional mode, the omnidirectional antenna radiates the energy and the directional antenna is off; and
in the directional mode, the directional antenna radiates the energy from the given side and the omnidirectional antenna is off.

9. The portable electronic device of claim 1, wherein the at least one antenna comprises a segmented antenna such that:
in the omnidirectional mode, all segments of the segmented antenna radiate the energy; and,
in the directional mode, a given subset of the segments of the segmented antenna radiates the energy from the given side and a remaining subset of the segments are off.

10. The portable electronic device of claim 1, wherein the at least one antenna comprises an omnidirectional antenna that can be switched between the omnidirectional mode and the directional mode.

11. The portable electronic device of claim 10, wherein the omnidirectional antenna that can be switched between the omnidirectional mode and the directional mode by transmitting antenna signals in a same phase in the directional mode and transmitting the antenna signals in different phases in the omnidirectional mode.

12. The portable electronic device of claim 11, wherein the at least one antenna comprises an antenna array.

13. The portable electronic device of claim 1, wherein the holder comprises a holster.

14. The portable electronic device of claim 1, wherein the holder comprises a device enabled to be worn by a user and further enabled to hold the portable electronic device.

15. The portable electronic device of claim 1, wherein the holder comprises one or more of a hook, a clip, and an accessory enabled to be worn by a user.

16. The portable electronic device of claim 1, further comprising at least one of a mobile electronic device, a portable communication device, a cell phone, a personal digital assistant, and a smart phone.

* * * * *